(12) United States Patent
Tsao et al.

(10) Patent No.: US 8,381,237 B2
(45) Date of Patent: Feb. 19, 2013

(54) OPTICAL DISC DRIVE WITH POSITIONING STRUCTURE OF MAIN SHAFT MOTOR

(75) Inventors: Yi-Cheng Tsao, Hsinchu (TW); Chun-Lung Ho, Hsinchu (TW)

(73) Assignee: Lite-On It Corp., Taipei (TW)

( * ) Notice: Subject to any disclaimer, the term of this patent is extended or adjusted under 35 U.S.C. 154(b) by 352 days.

(21) Appl. No.: 12/704,273

(22) Filed: Feb. 11, 2010

(65) Prior Publication Data
US 2010/0142351 A1 Jun. 10, 2010

Related U.S. Application Data

(63) Continuation-in-part of application No. 11/306,157, filed on Dec. 19, 2005, now abandoned.

(30) Foreign Application Priority Data

Sep. 15, 2005 (TW) .............................. 94131798 A

(51) Int. Cl.
*G11B 17/028* (2006.01)
(52) U.S. Cl. ........................................................ 720/697
(58) Field of Classification Search .................. 720/604, 720/605, 652, 689–700
See application file for complete search history.

(56) References Cited

U.S. PATENT DOCUMENTS

| | | | |
|---|---|---|---|
| 6,028,737 A | 2/2000 | Khuu | |
| 6,693,868 B2 | 2/2004 | Saito | |
| 6,792,614 B1 | 9/2004 | Matsumura et al. | |
| 7,271,513 B2 | 9/2007 | Xu et al. | |
| 2003/0112734 A1* | 6/2003 | Shishido et al. | 369/263 |
| 2004/0022154 A1 | 2/2004 | Yang et al. | |
| 2004/0111733 A1 | 6/2004 | Bae | |
| 2004/0205794 A1* | 10/2004 | Chang | 720/675 |
| 2004/0268374 A1 | 12/2004 | Lu | |
| 2007/0240177 A1* | 10/2007 | Matsui | 720/697 |

* cited by examiner

Primary Examiner — Nathan Danielsen
(74) Attorney, Agent, or Firm — WPAT PC; Justin King

(57) ABSTRACT

A traverse for an optical disc drive comprising a base, a main shaft motor, a pick-up motor and a pick-up head module is provided. The base includes a bottom plate and a plurality of raised mesas. The bottom plate has an opening and the raised mesas connect with the bottom plate. The main shaft motor is disposed on the raised mesas. The pick-up motor is disposed on the bottom plate and the pick-up head module connects with the pick-up motor. The pick-up motor enables the pick-up head module to move inside the opening. Additionally, the present invention also provides an optical disc drive with the said traverse.

4 Claims, 8 Drawing Sheets

OPTICAL DISC DRIVE WITH POSITIONING STRUCTURE OF MAIN SHAFT MOTOR

BACKGROUND OF THE INVENTION

1. Field of the Invention

The present invention relates to an optical disc drive and more particularly, to an easy-to-assemble traverse for an optical disc drive.

2. Description of the Related Art

The optical disc has many advantages including inexpensiveness, light weight, easy storage and large storage capacity in which the data storage period is long and the data are less vulnerable to damage and so forth. Consequently, optical discs have gradually replaced the conventional magnetic storage medium to become an indispensable optical storage medium in our daily life. Because of the widespread deployment of optical discs, an optical disc drive for reading out the data from an optical disc has also become a commonly used electronic product in our everyday life.

FIG. 1A is a perspective view of the traverse of a conventional optical disc drive. FIG. 1B is a partially exploded view of the major components of the optical disc drive in FIG. 1A. FIG. 1C is a diagram showing the structure of the main shaft motor adapter as shown in FIG. 1A. As illustrated in FIGS. 1A through 1C, the traverse 100 of a conventional optical disc drive includes a base 110, a main shaft motor 120, a pick-up motor 130, a pick-up head module 140 and a main shaft motor adapter 150. The base 110 has an opening 112 and the pick-up motor 130 is disposed on the base 110. The pick-up head module 140 and the pick-up motor 130 are connected. Additionally, the pick-up motor 130 is suitable for moving the pick-up head module 140 inside the opening 112. In addition, the main shaft motor adapter 150 is disposed on the base 110 and the main shaft motor 120 is disposed on the main shaft motor adapter 150.

In the design of the traverse 100 inside an optical disc drive, a suitable height level D between the main shaft motor 120 and the base 110 is required. As a result, the optical disc carried by the main shaft motor 120 is in a suitable position for focusing and reading by the pick-up head module 140. However, due to the cumulative tolerance of mounting the main shaft motor adapter 150 to the base 110 and the main shaft motor 120 to the main shaft motor adapter 150, the actual location of the assembled main shaft motor 120 is not accurate which cause the decrease of the reliability and stability in production.

In addition, the process of assembling of the main shaft motor 120 includes mounting the main shaft motor adapter 150 to the base 110 before assembling the main shaft motor 120 to the main shaft motor adapter 150. Accordingly, more assembling time is required, so that the production efficiency of the process is low with high production cost.

SUMMARY OF THE INVENTION

Accordingly, at least one objective of the present invention is to provide an optical disc drive and a traverse thereof that can improve the reliability and stability of the product.

At least another objective of the present invention is to provide an optical disc drive and a traverse thereof that can reduce the production cost of the product.

To achieve these and other advantages and in accordance with the purpose of the invention, as embodied and broadly described herein, the invention provides a traverse for an optical disc drive. The traverse comprises a base, a main shaft motor, a pick-up motor and a pick-up head module. The base includes a bottom plate and a plurality of raised mesas. The bottom plate has an opening and the raised mesas connect with the bottom plate. The main shaft motor is disposed on the raised mesas. The pick-up motor is disposed on the bottom plate and the pick-up head module connects with the pick-up motor. The pick-up motor enables the pick-up head module to move inside the opening.

In the aforesaid traverse of the optical disc drive, the bottom plate and the raised mesas are formed as an integrative unit.

In the aforesaid traverse of the optical disc drive, the main shaft motor includes a carrier platen, disposed on the raised mesas and a motor body, disposed on the carrier platen.

The aforesaid traverse of the optical disc drive further includes a plurality of locking elements. Furthermore, the top surface of each raised mesa has a first positioning hole. The carrier platen has a plurality of second positioning holes that corresponds to the respective first positioning holes and the locking elements pass through the first and the second positioning holes to dispose inside them. In addition, the locking elements include screws.

In the aforesaid traverse of the optical disc drive, the distances between the top surface of various raised mesas and the bottom plate are equal.

The present invention also provides an optical disc drive comprising a housing and the aforesaid traverse, so that the traverse is disposed inside the housing.

The aforesaid optical disc drive further includes a sliding tray disposed inside the housing. Furthermore, the sliding tray is suitable for ejecting out of the housing.

Since the main shaft motor in the present invention is directly fastened to the raised mesas on the base, the positional accuracy after assembling the main shaft motor and the base together is increased, so that the reliability and stability of the product is improved. In addition, the present invention does not require a main shaft motor adapter. Accordingly, material costs and the cost incurred in connection with the time wasted in assembling the main shaft motor adapter to the base are saved. In conclusion, the production cost is reduced and the production efficiency is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
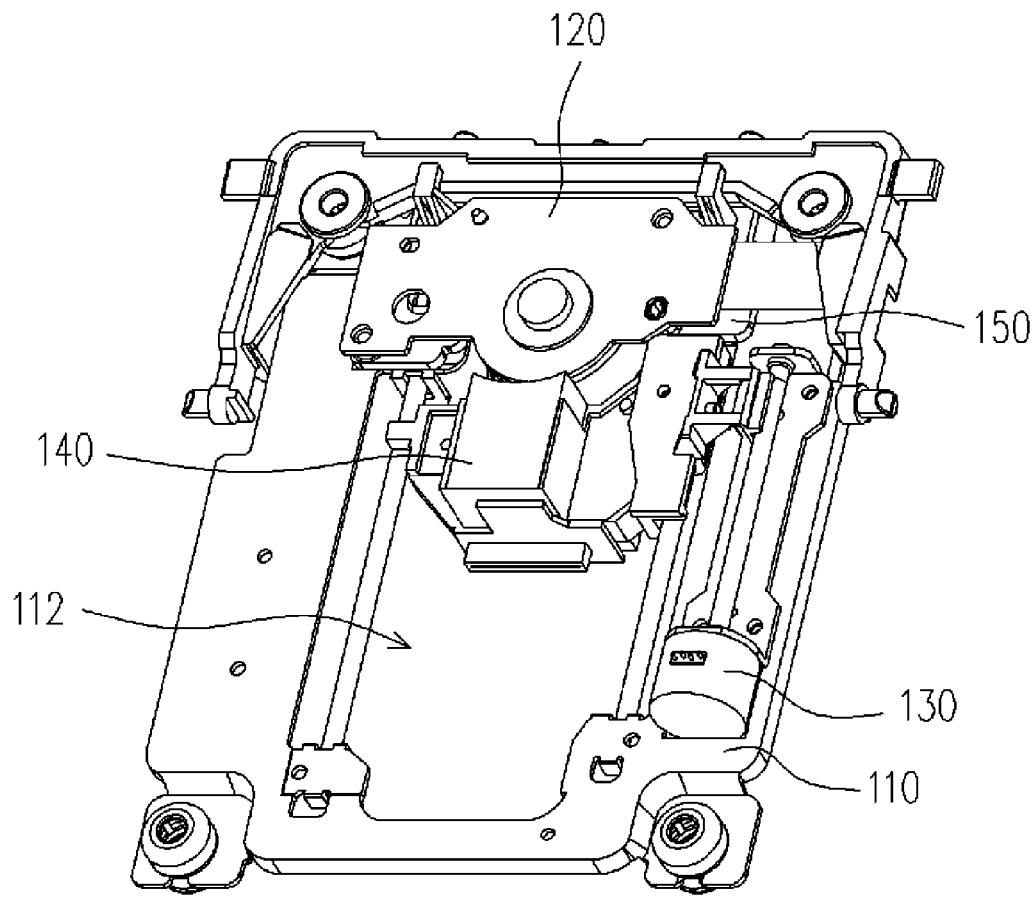
FIG. 1A is a perspective view of the traverse of a conventional optical disc drive.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
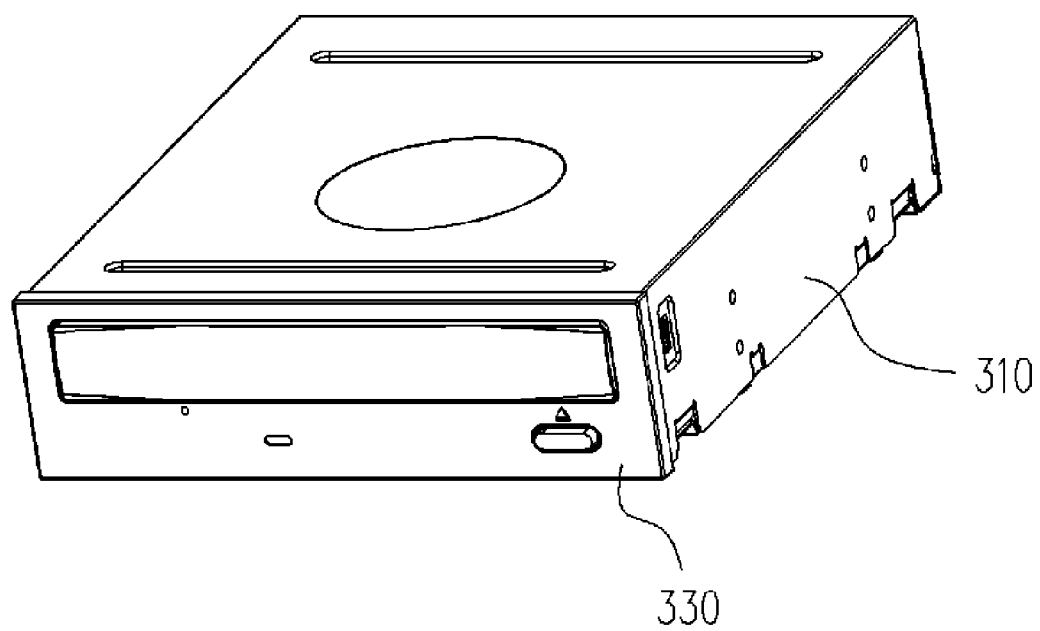
FIG. 2A is a perspective view illustrating the structure of an optical disc drive according to one embodiment of the present invention.
Figure 2B:
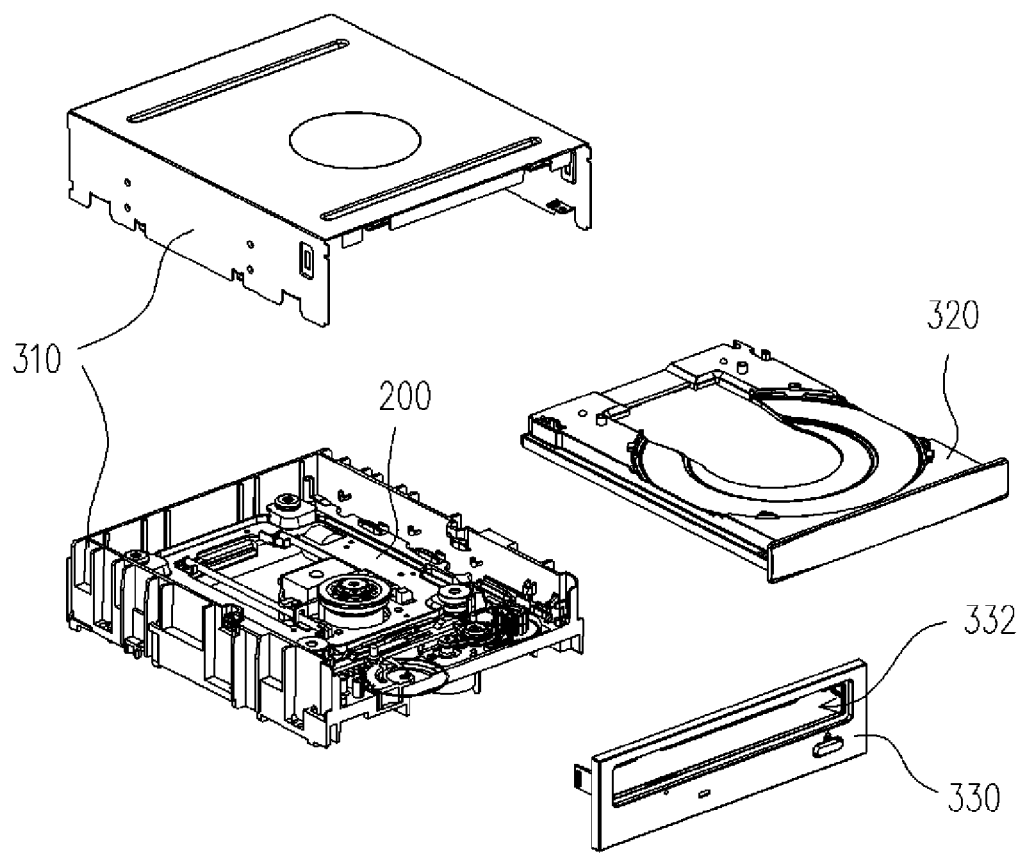
FIG. 2B is an explosion view illustrating the major components in the optical disc drive shown in FIG. 2A.
Figure 3A:
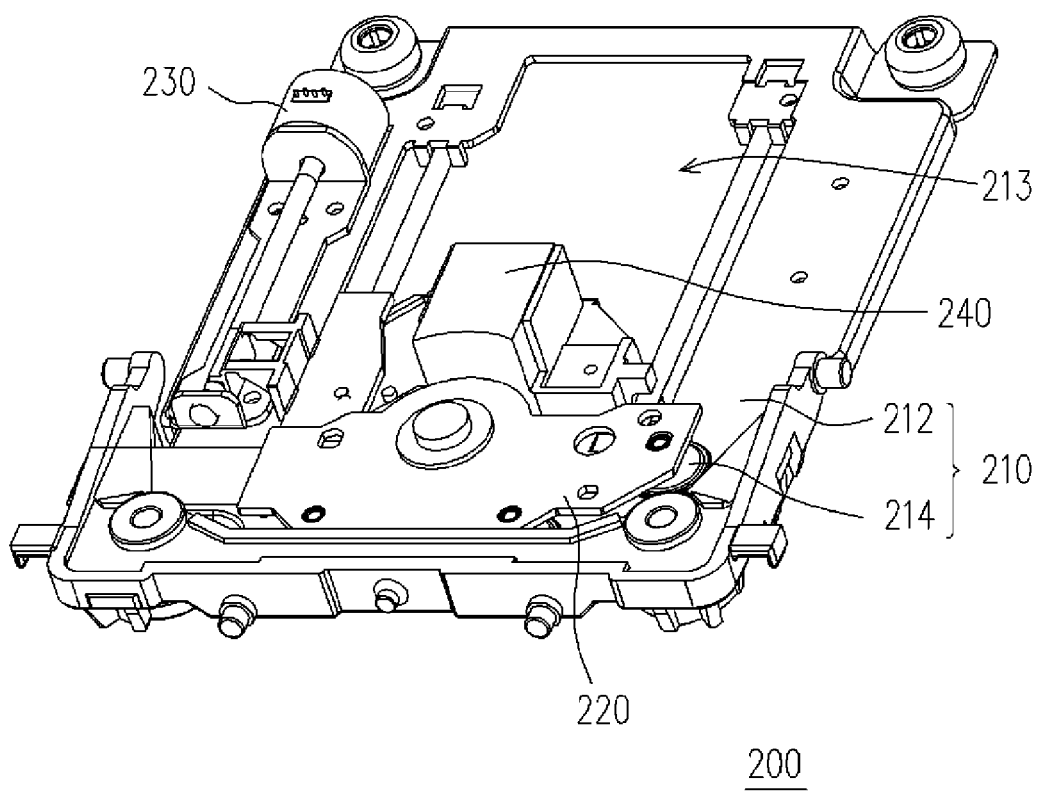
FIG. 3A is a perspective view illustrating the structure of the traverse in FIG. 2B.
Figure 3B:
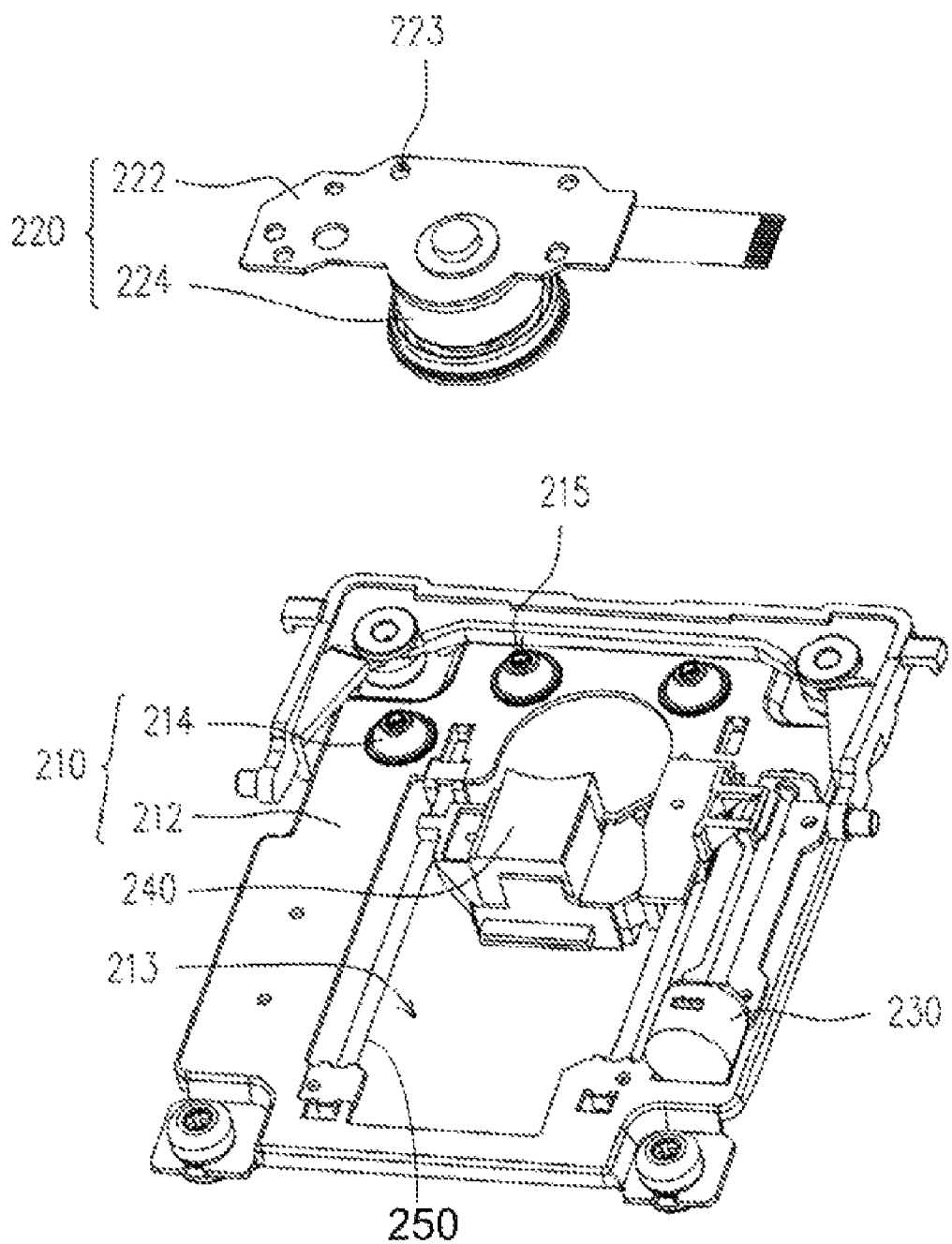
FIG. 3B is a partial explosion view illustrating the major components of the traverse in FIG. 3A.

FIG. 2A is a perspective view illustrating the structure of an optical disc drive according to one embodiment of the present invention. FIG. 2B is an explosion view illustrating the major components in the optical disc drive in FIG. 2A. FIG. 3A is a perspective view illustrating the structure of the traverse in FIG. 2B. FIG. 3B is a partial explosion view illustrating the major components of the traverse in FIG. 3A. As illustrated in FIGS. 2A, 2B, 3A and 3B, the optical disc drive 300 in the present embodiment mainly includes a housing 310 and a traverse 200. The traverse 200 is disposed inside the housing 310. The traverse 200 comprises a base 210, a main shaft motor 220, a pick-up motor 230 and a pick-up head module 240. The base 210 includes a bottom plate 212 and a plurality of raised mesas 214. The bottom plate 212 has an opening 213 and the raised mesas 214 connect with the bottom plate 212. The main shaft motor 220 is disposed on the raised mesas 214. The pick-up motor 230 is disposed on the bottom plate 212 of the base 210 and the pick-up head module 240 connects with the pick-up motor 230 and is supported by a guide rod 250. Additionally, the pick-up motor 230 is designed to move the pick-up head module 240 on the guide rod 250 inside the opening 213. The main shaft motor 220 is disposed on one side of the guide rod 250, and one of the raised mesas 214 is disposed on the other side of the guide rod 250.

The aforesaid optical disc drive 300 may further include a sliding tray 320, disposed inside the housing 310 and a front cover 330, disposed on the housing 310. Additionally, the sliding tray 320 is designed to eject from the housing 310 through an opening 332 in the front cover 330, so that a user can insert an optical disc. In addition, the main shaft motor 220 of the optical disc drive 300 will spin the optical disc in a very high speed. In the meantime, the pick-up motor 230 moves the pick-up head module 240, so that data can be read from the optical disc.

In one preferred embodiment of the present invention, the main shaft motor 220 of the traverse 200 comprises a carrier platen 222, disposed on the raised mesas 214 and a motor body 224, disposed on the carrier platen 222. More specifically, the top surface of each raised mesa 214 has a first positioning hole 215. The carrier platen 222 has a plurality of second positioning holes 223, corresponding to the respective first positioning holes 215. In the present embodiment, the carrier platen 222 of the main shaft motor 220 is tightened to the raised mesas 214 on the base 210 by screwing a plurality of locking elements, such as screws, into the first and the second positioning holes 215 and 223.

Figure 4A:
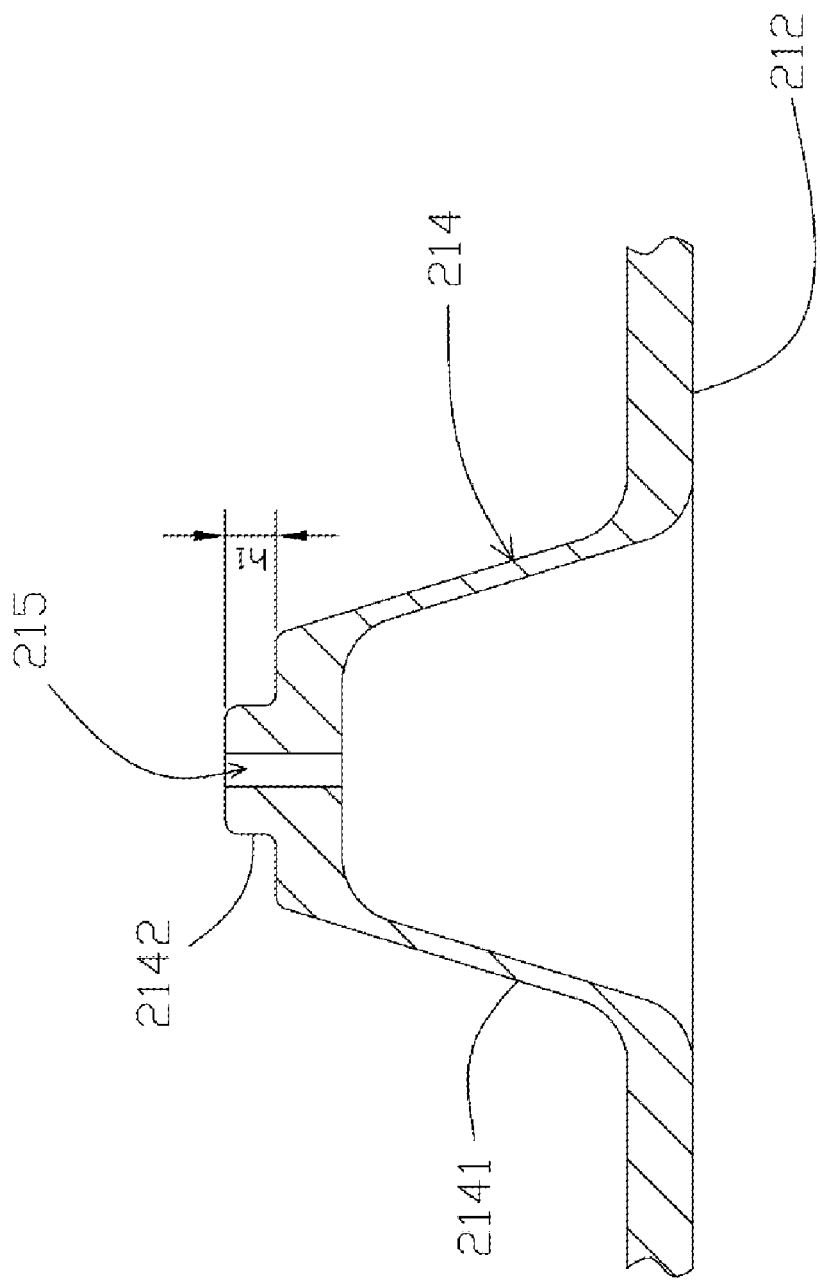
FIG. 4A is a cross-sectional view illustrating the structure of the raised mesa in FIG. 3B.
Figure 4B:
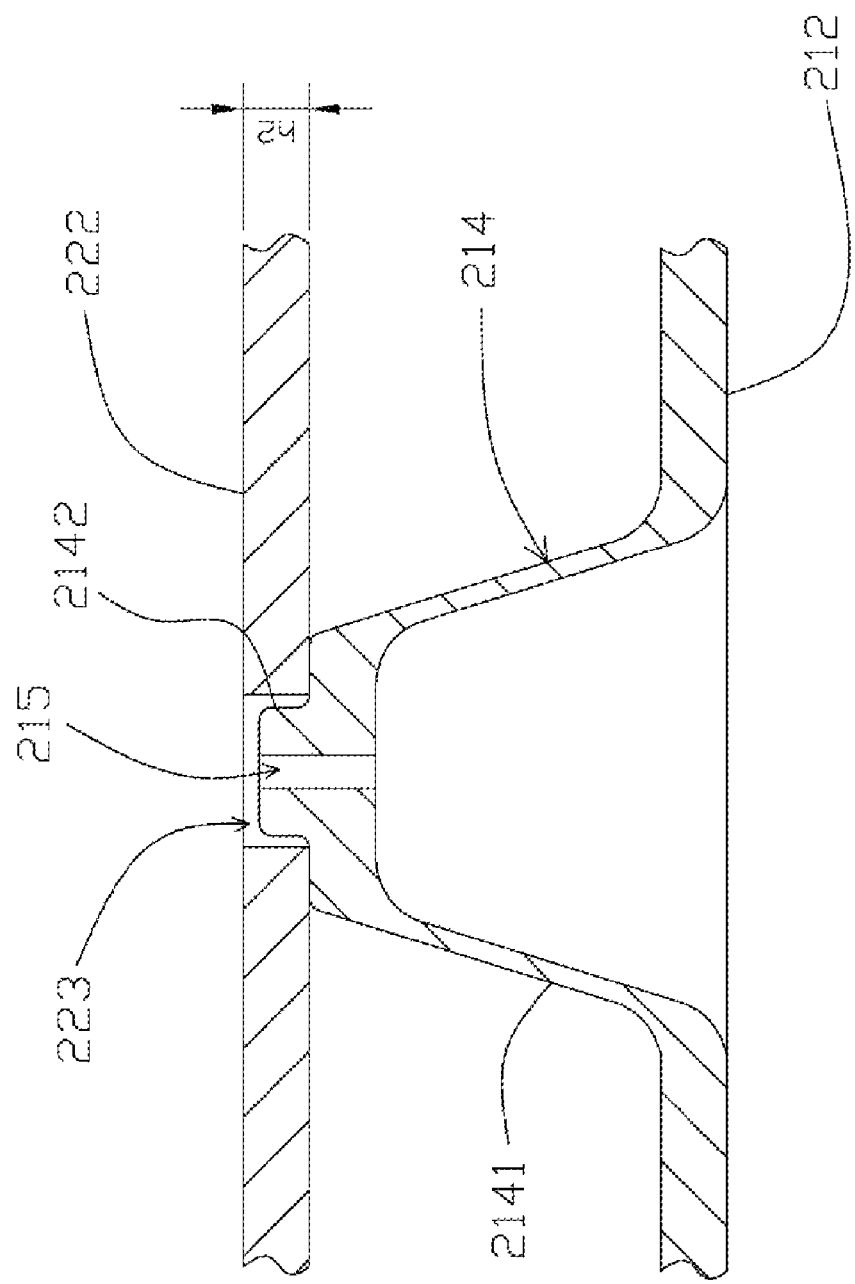
FIG. 4B is a cross-sectional view illustrating the structure of the raised mesa with the carrier platen in FIG. 3B.

Please refer to FIGS. 4A and 4B. FIG. 4A shows a cross-sectional view of the raised mesa 214, and FIG. 4B shows a cross-sectional view of the raised mesa 214 with the carrier platen 222. The raise mesa comprises a cup part 2141 and a position part 2142. The position part 2142 is protruded from the top surface of the cup part 2141 and has a height h1. The first positioning hole 215 passes through the position part 2142 and the top surface of the cup part 2141.

The carrier platen 222 of the main shaft motor 220 is supported on the top surface of the cup part 2141 of the raised mesa 214, and the position part 2142 of the raised mesa 214 is located inside the second positioning hole 223 for positioning the carrier platen 222. The second positioning hole 223 has a height h2, and the height h1 of the position part 2142 is lower than the height h2 of the second positioning hole 223. The locking element, such like a screw, locks the carrier platen 222 to the raised mesa 214 by screwing into the first and the second positioning holes 215 and 223.

In the present embodiment, the raised mesas 214 are formed by directly drawing from the bottom plate 212. After forming the various raised mesas 214, the distance between the top surface of the raised mesas 214 and the bottom plate 212 are the same to avoid the carrier platen 222 of the main shaft motor 220 from tilting after the carrier platen 222 locking into the raised mesas 214. In addition, the distance from the top surface of the raised mesas 214 to the bottom plate 212 is identical to the thickness D of the main shaft motor adapter 150 (as illustrated in FIG. 1C) in the conventional technique. Accordingly, the main shaft motor 220 assembled to the raised mesas 214 can support an optical disc at a position suitable for data reading by a pick-up head module. In other words, the raised mesas 214 in the present embodiment are used to replace the main shaft motor adapter 150 in the conventional technique.

Figure 1B:
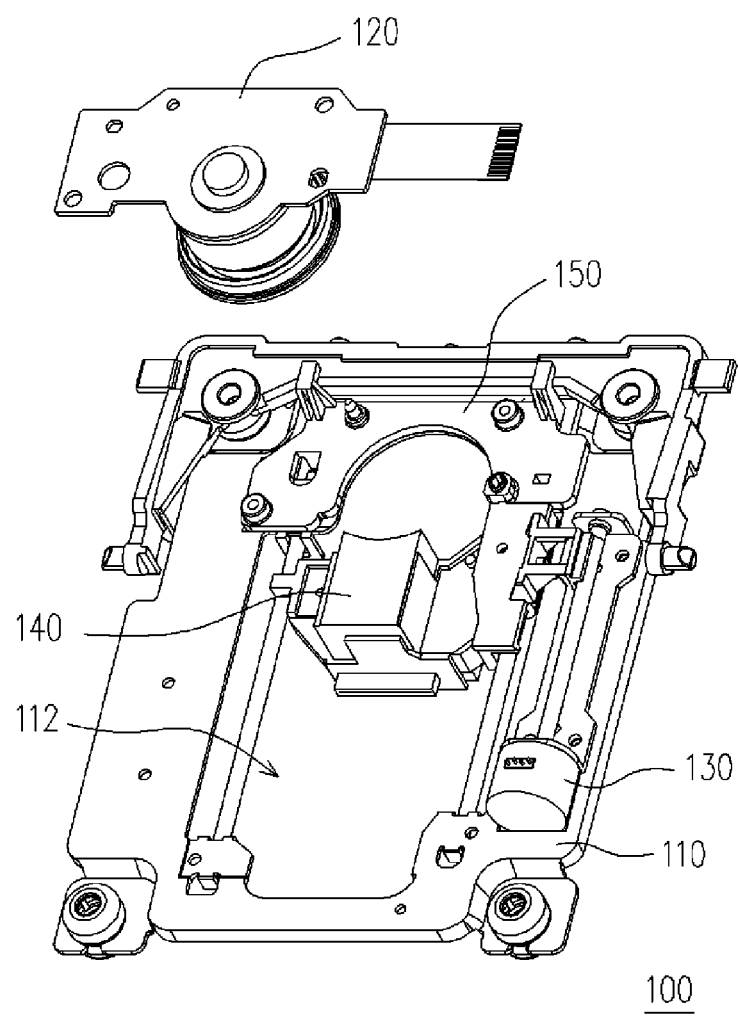
FIG. 1B is a partially exploded view of the major components of the optical disc drive in FIG. 1A.
Figure 1C:
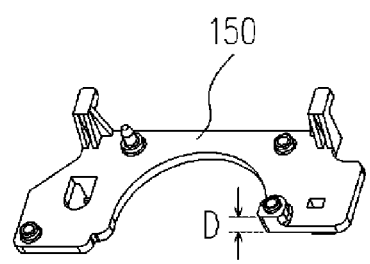
FIG. 1C is a perspective view illustrating the structure of the main shaft motor adapter as shown in FIG. 1A.

In the present embodiment, the raised mesas 214, which replaces the conventional main shaft motor adapter 150 (as illustrated in FIG. 1B), and the bottom plate 212 of the traverse 200 are formed as an integrative unit to avoid the cumulative tolerance when the main shaft motor adapter 150 is assembled to the base 110 (as illustrated in FIG. 1B) in the conventional technique. Therefore, the positioning accuracy after assembling the main shaft motor 220 to the base 210 can be substantially improved for better reliability and stability of the product.

In addition, the main shaft motor 220 in the present embodiment is directly assembled to the raised mesas 214; therefore, there is no need to use a main shaft motor adapter 150. Accordingly, material cost and the time for assembling the main shaft motor adapter 150 are saved with improved productivity and reduced production cost.

It should be noted that the spirit of the present invention lies in directly setting up raised mesas capable of supporting the main shaft motor on the bottom plate. There are no particular restrictions on the shape and number of the raised mesas. In fact, anyone familiar with the technique can provide a suitable modification based on the aforesaid embodiment of the present invention and yet should still be regarded as falling within the scope of the present invention.

In summary, the optical disc drive and the traverse therein have at least the following advantages:

1. The main shaft motor is directly fastened to the raised mesas of the base; therefore, the present invention can avoid positioning inaccuracy caused by the accumulation of tolerance when assembling a main shaft motor and a base together in the conventional technique and can improve reliability and stability of the product.

2. The main shaft motor adapter is no longer needed; therefore, the material cost of the main shaft motor adapter and the time for assembling the adapter are saved with lower the production cost and increased productivity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive, comprising:
    a base having a bottom plate and three raised mesas protruding from the base, wherein the raised mesa comprises a cup part and a position part, and the raised mesas and the bottom plate are formed as an integrative unit;
    a main shaft motor having a carrier platen for supporting a motor body, wherein the carrier platen has a plurality of positioning holes corresponding to the respective raised mesas;
    a pick-up motor disposed on the base; and
    a pick-up head module connected to the pick-up motor and supported on a guide rod, wherein the pick-up motor drives the pick-up head module to move on the guide rod,
    wherein the thickness of the cup part is thinner than the thickness of the bottom plate,
    wherein the motor body is disposed on one side to the guide rod, and one of the raised mesas is disposed on the other side of the guide rod, wherein the other two raised mesas are disposed on the same side to the guide rod with the motor body and are disposed at different sides to a rotating center of the motor body.

2. The optical disc drive of claim 1, further comprising a sliding tray disposed above the base for supporting an optical disc, wherein the cup part is continuously extended and protruded from the bottom plate and has an opening facing the sliding tray.

3. An optical disc drive, comprising:
    a base having a bottom plate and three raised mesas protruding from the base, wherein the raised mesa comprises a cup part and a position part, and the raised mesas and the bottom plate are formed as an integrative unit;
    a sliding tray disposed above the base for supporting an optical disc, wherein the cup part is continuously extended and protruded from the bottom plate and has an opening facing the sliding tray;
    a main shaft motor having a carrier platen for supporting a motor body, wherein the carrier platen has a plurality of positioning holes corresponding to the respective raised mesas;
    a pick-up motor disposed on the base; and
    a pick-up head module connected to the pick-up motor and supported on a guide rod, wherein the pick-up motor drives the pick-up head module to move on the guide rod,
    wherein the motor body is disposed on one side to the guide rod, and one of the raised mesas is disposed on the other side of the guide rod, wherein the other two raised mesas are disposed on the same side to the guide rod with the motor body and are disposed at different sides to a rotating center of the motor body.

4. The optical disc drive of claim 3, wherein the thickness of the cup part is thinner than the thickness of the bottom plate.

* * * * *